United States Patent Office 2,954,273
Patented Sept. 27, 1960

2,954,273

PROCESS OF ELIMINATING HYDROGEN PEROXIDE IN SOLUTIONS CONTAINING PLUTONIUM VALUES

James G. Barrick, Oak Ridge, Tenn., and Bernard A. Fries, El Cerrito, Calif., assignors to the United States of America as represented by the United States Atomic Energy Commission No Drawing. Filed Oct. 22, 1945, Ser. No. 623,878

3 Claims. (Cl. 23—14.5)

This invention relates generally to a procedure for processing materials containing the element of atomic number 94, known as plutonium. More particularly, this invention concerns certain operations in a separatory and concentration procedure involving the separation of plutonium as a peroxide and the rendering of the supernatant liquid, which contains plutonium, from this separation reutilizable for the separation and recovery of plutonium therefrom or for other purposes.

As described herein, the isotope of element 94 having a mass of 239 is referred to as $94^{239}$ and is also called plutonium, symbol Pu. In addition, the isotope of element 93 having a mass of 239 is referred to as $93^{239}$. Reference herein to any of the elements is to be understood as denoting the element generically, whether in its free state or in the form of a compound, unless indicated otherwise by the context.

Elements 93 and 94 may be obtained from uranium by various processes which do not form a part of the present invention including irradiation of uranium with neutrons from any suitable neutron source, but preferably the neutrons used are obtained from a chain reaction of neutrons with uranium.

Naturally occurring uranium contains a major portion of $_{92}U^{238}$, a minor portion of $_{92}U^{235}$, and small amounts of other substances such as $UX_1$ and $UX_2$. When a mass of such uranium is subjected to neutron irradiation, particularly with neutrons of resonance or thermal energies, $_{92}U^{238}$ by capture of a neutron becomes $_{92}U^{239}$ which has a half life of about 23 minutes and by beta decay becomes $93^{239}$. The $93^{239}$ has a half life of about 2.3 days and by beta decay becomes $94^{239}$. Thus, neutron irradiated uranium contains both $93^{239}$ and $94^{239}$ but by storing such irradiated uranium for a suitable period of time, the $93^{239}$ is converted almost entirely to $94^{239}$.

In addition to the above-mentioned reaction, the reaction of neutrons with fissionable nuclei such as the nucleus of $U^{235}$ results in the production of a large number of radioactive fission products. As it is undesirable to produce a large concentration of these fission products which must, in view of their high radioactivity, be separated from $94^{239}$ and further as the weight of radioactive fission products present in neutron irradiated uranium is proportional to the amounts of $93^{239}$ and $94^{239}$ formed therein, it is preferable to discontinue the irradiation of the uranium by neutrons when the combined amount of $93^{239}$ and $94^{239}$ is equal to approximately 0.02 percent by weight of the uranium mass. At this concentration of these substances, the concentration of fission elements which must be removed is approximately the same percentage.

A number of processes have already been proposed for accomplishing the separation and concentration of Pu. Certain of these processes are generally known as the "bismuth phosphate" type process and the "wet fluoride" type of process. These processes are the invention of others and the details of the processes are described in copending applications as for example app. Ser. No. 519,714, now U.S. Patent 2,785,951, issued March 19, 1957, to be referred to hereinafter. Consequently, all of the details of operation of the aforementioned processes are not described herein.

In one type of procedure in successful use it is customary to utilize both the bismuth phosphate treatment and the lanthanum fluoride treatment. Consequently, the bismuth phosphate treatment is briefly referred to herein for background although the present invention is concerned particularly with steps associated with the treatment of the fluoride type of carrier precipitates. That is, the present invention is usually carried out in conjunction with the treatment of the fluoride type of precipitates, exemplified by lanthanum fluoride precipitates carrying Pu, or other fluoride materials such as potassium plutonium fluoride as will be described in detail hereinafter.

In processes of the aforementioned type, either combination processes where several different types of carriers are used in which a fluoride carrier precipitation is accomplished in at least one of the steps, or processes wherein fluoride compounds are more or less directly precipitated, these fluoride precipitates carrying Pu or comprising a fluoride compound of Pu are redissolved and subjected to further treatments such as the precipitation of Pu as the peroxide. In existing processes prior to the present invention, this peroxide precipitation step has involved certain difficulties. For example, some of the Pu is found in the supernatant liquid associated with the peroxide precipitated. The Pu is very valuable and if this Pu is lost this constitutes a severe detriment. It is proposed to recycle this liquid to an earlier step in the process. However, it has been found that the supernatant liquid as described also contains residual peroxides and because of the bubbling action, the gas evolution and reducing properties of the residual peroxide, it is not suitable for recycling as is. In addition, regardless of the specific use of the supernatant because of certain hazards due to exothermic reactions which may occur in such liquid it is desirable that the liquid be processed by our invention.

The redissolving, aforementioned, of fluoride carrier containing Pu is accomplsihed by a procedure termed metathesis, and briefly may comprise the following: The plutonium-carrying lanthanum fluoride precipitate is treated in a suitable vessel by adding several liters of 10 to 15 percent KOH or NaOH solution thereto and maintaining the resulting slurry between about 50° C. and 85° C. for a period of 1-2 hours. Exchange of hydroxyl ions for fluoride ions of the lanthanum fluoride occurs to form an insoluble lanthanum hydroxide which carries the plutonium, while the fluoride ions go into solution. The metathesized material is separated from the solution and is carefully washed with water to remove fluoride ion therefrom as completely as possible. Alternatively, the plutonium-carrying lanthanum fluoride precipitate may be metathesized with a solution of potassium carbonate. For example, 45 liters of a 45 to 50 percent solution of potassium carbonate may be added in two steps to a vessel containing the lanthanum fluoride precipitate and the resultant slurry maintained at a temperature of 90° C. to 75° C. for a period of about 1 to 2 hours. The lanthanum fluoride precipitate dissolves in the potassium carbonate solution. The resulting solution is made 15% in KOH by adding a 40% solution of KOH or NaOH to form a lanthanum hydroxide precipitate which also carries the plutonium. This precipitate is separated by a method such as centrifugation and is carefully washed to remove fluoride ion. The washed fluoride-free materials resulting from either of the foregoing metathesis procedures may be treated with dilute nitric acid or other suitable solvent or additions to yield a solution upon which a peroxide precipitation may be carried out.

The particular type of metathesis employed is not a limitation on the present invention. Further details on such procedures are described in the copending case of one of the inventors herein, Ser. No. 652,829, filed March 7, 1946, in the name of B. A. Fries, now U.S. Patent 2,912,303, issued November 10, 1959.

In accordance with the present invention we have found that said supernatant liquid containing residual peroxide may be treated with various additions exemplified by nitrites or sulfites to render the liquid non-hazardous and suitable for recycling or other purposes. In the event that the liquid is treated directly, the addition may be of about 3 molar strength and the temperature should be maintained below 25° C. By a certain procedure, however, in accordance with the present invention the additions may be made of 10 molar strength when the acidity of the liquid treated has been reduced or buffered.

By the present invention which may utilize the same steps which have been previously used, but supplemented and altered in certain respects the advantages of preventing plutonium losses and the reduction of certain hazards may be obtained as will be described.

The meaning of the terms bismuth phosphate type of process, wet fluoride type of process, product precipitate, and similar terms will be apparent as the description proceeds.

This invention has for one object, to provide improvements in methods for the separation and recovery of plutonium.

Another object is to provide a method of separating plutonium by a procedure characterized in that there are coupled with certain steps different reagents and procedure than have heretofore been used.

Still another object is to provide a procedure for treating supernatant liquids from Pu peroxide precipitations.

A still further object is to provide a process for destroying peroxide in liquids containing Pu which are intended for recycling.

Still another object is to provide certain new and improved recycling operations which lend themselves to the use of and to coupling with steps already known or practiced for the separation and recovery of Pu.

Another object is to provide a process for the destruction of residual peroxides and otherwise improving liquid for recycling which may be applied to existing processes and which may be carried out in existing equipment with a minimum of change.

Still another object is to provide a process of the class described which may be carried out in conjunction with the treatment of fluoride precipitates containing Pu either in relative small or large amounts.

Other objects will appear hereinafter.

As pointed out above, this invention relates to a process of treating liquids from plutonium peroxide precipitation for rendering such liquids non-hazardous and suitable for further purposes. This liquid, which may be termed the peroxide mother liquid, the supernatant liquid or the decantate depending upon the particular procedure which has been employed for separating the plutonium peroxide or the liquid from the plutonium peroxide, is the liquid with which the present invention is primarily concerned. As already described, the liquid may be reutilized by recycling which is the preferred procedure in the present invention. However, there are other modes of reutilizing the liquid varying from sending the liquid to waste to reworking the liquid by a lanthanum fluoride oxidation-reduction cycle. Regardless of the method of re-utilizing this liquid, it has been found that it is highly desirable to treat the liquid under consideration by the procedure of the present invention rather promptly because of its possible hazardous nature.

This liquid may be hazardous particularly if it contains very much iron. In the absence of iron or plutonium such liquid undergoes no rise in temperature even though it contains a number of other components such as chromium, manganese, nickel, columbium, cerium, silicon dioxide or the like. However, if the solution is, for example, only .01 molar in $Fe^{+3}$, any residual peroxide in the liquid decomposes with the evolution of heat and unless the solution is cooled, the temperature rises with increasing rapidity and increasing effervescence may occur. It has also been noted that cupric ion significantly augments the effect of iron. With an iron concentration of .01 M the rate of decomposition at about 20° C. is quite low, at 40° C. the rate increases significantly and at 60° C. it becomes sufficiently rapid to constitute a substantial hazard in industrial plant operation.

Therefore in addition to providing a method of permitting the recovery of any Pu in this liquid, the treatment of the present invention has been found to render the liquid non-hazardous. In general the operation of the present invention may be simply carried out in substantially the same equipment used in the isolation operations which may be generally described as follows: The supernatant or decantate liquid containing residual peroxide is transferred from the precipitator to a catch tank where it is temporarily retained and cooled. Then the Pu peroxide precipitate in the precipitator may be removed by dissolving it and transferring the resulting solution from the precipitator. The supernatant liquid in the catch tank is then transferred back to the precipitator where the treatment in accordance with the present invention may be carried out. After such treatment the liquid may be recycled to earlier steps in the process such as to a by-product precipitation step. Various details pertaining to these steps will be apparent from the several examples which are set forth. While it is preferred to use sodium nitrite for treating the liquid and to recycle the treated liquid, other variations may be applied in carrying out the present invention as will also be apparent from the several examples.

In the several examples which follow the plutonium containing materials treated will have been treated preliminarily prior to the concentration operations by standard procedures already discussed earlier in the present disclosure. That is, the plutonium materials will have been subjected to one or more bismuth phosphate or equivalent cycles for decontamination and volume reduction. Then the plutonium materials will have been subjected to the lanthanum fluoride or equivalent by-product precipitation, a lanthanum fluoride or equivalent product precipitation, metathesis and the plutonium peroxide precipitation applied to the nitrate solution of the plutonium ultimately resulting from the metathesis and associated steps. The supernatant liquids from the one or more plutonium peroxide precipitation steps are the liquids treated by the present invention, and provide a liquid which may be recycled to, for example, one or more of the lanthanum fluoride precipitation steps aforementioned. In the examples which follow all of the associated steps may not necessarily be described. However, it is to be understood that such steps may comprise the background operations in conjunction with which the present invention may be carried out.

Reference is now made to the examples.

*Example I*

In this example the process will be considered as starting with the isolation step on a batch of material comprising a 1 normal nitric acid solution from metathesis which contained approximately 8.25 grams per liter of $Pu^{+4}$, 37 grams per liter of $La^{+3}$ and which occupied a volume of about 8 gallons. This solution had resulted from previous treatment including treating an oxidized solution containing Pu from a bismuth phosphate by-product precipitation step with a lanthanum fluoride by-product precipitation step and separating the LaF$_3$ precipitate leaving an oxidized solution containing the Pu therein. Recycled liquid was added at this point. This Pu was carried down as a precipitate by means of forming a lanthanum fluoride carrier product precipitate therein. This LaF$_3$ product precipitate, containing Pu, was metathesized with KOH—K$_2$CO$_3$ as described earlier herein, there finally being obtained the 1 normal nitric acid solution containing the 8.25 grams per liter of Pu aforementioned.

This nitric acid solution was filtered, with the assistance of a suitable filter aid such as Hyflo Super-cel filter aid, into a precipitator. The filtered Pu containing solution was adjusted to exactly 1 N in nitric acid by the addition of potassium hydroxide and then made .1 N in sulfuric acid by adding the requisite quantity of 96% H$_2$SO$_4$. The solution was cooled to 20° C. and sufficient 27%–30% H$_2$O$_2$ of a predetermined high quality added continuously over a period of about 1 hour to give a 10% by weight excess of 100% H$_2$O$_2$ in the solution. During this operation the temperature was maintained below 20° C. and the resultant slurry comprising plutonium peroxide and supernatant liquid was digested for 1 hour at not above 20° C.

Thereafter this slurry was cooled to between 3° C. to 8° C. with agitation and held within that temperature range for several hours without agitation following which a clear supernatant, namely the supernatant liquid with which the treatment of the present invention is particularly concerned, was aspirated into an overhead evacuated tank by means of a draw-off pipe. The pipe was gradually lowered into the precipitator as the liquid level receded and the withdrawal of liquid was stopped when the volume of precipitate and liquid heel remaining in the precipitator was about 3.75 liters. The withdrawn supernatant to be treated by the process of the present invention was dropped from the overhead tank into a catch tank before its temperature had risen above 20° C. and was temporarily stored at a temperature not greater than 20° C.

The plutonium peroxide precipitate in the precipitator was then washed at 5–8° C. by adding 4–6 liters of 6% nitric acid solution, stirring the precipitate for 30 minutes then resettling. Approximately 4 liters of further supernatant to be treated by the present invention was withdrawn as before. This washing was repeated several times with the supernatants being withdrawn in each instance for treatment.

The washed plutonium peroxide was then dissolved in nitric acid and removed from the precipitator for further treatment which in this particular example under consideration comprised a second precipitation of plutonium peroxide which also furnished further supernatant liquid for processing in accordance with the present invention. Since the details of this second precipitation are similar to those already set forth, repetition of this description is not deemed necessary.

Turning now to the details which pertain particularly to the present invention, the supernatant from the first precipitation contained about 3.6 grams of Pu in 30 gallons of liquid and the supernatant from the second precipitation contained about 1.2 grams of Pu in a similar volume of liquid. The treatment of these supernatants were as follows: The liquid was maintained at a temperature below 20° C. with agitation during the period of collection and temporary storage aforementioned. It was then transferred to the precipitator from which the peroxide precipitate had been removed and about 15 volumes of 60% nitric acid per hundred volumes of liquid added. A sufficient volume of 20% sodium nitrite, equal to 85% of the volume of the supernatant before the nitric acid addition, was then added at such a rate (usually over a period of about an hour) that the temperature did not rise much above 15° C. The solution was sampled and tested colorimetrically for excess nitrite using as an indicator a solution of dimethyl aniline and benzidine in 6 N acetic acid. The addition of the sodium nitrite was continued until nitrite in excess was shown to be present by the colorimetric test. When the presence of the excess nitrite was established, 4% potassium permanganate solution was added slowly until a permanent pink color appeared. The resultant pink colored solution is now of a non-hazardous nature and can be easily recycled to a preceding step so that the residual few grams of plutonium therein may be recovered. In this particular example the supernatant was recycled to the lanthanum fluoride by-product precipitation step, the potassium permanganate being an oxidizing agent in this step. By such procedure on any batch substantially complete recovery of Pu, excepting for a small amount lost in the by-product precipitates or on the filters, was accomplished.

*Example II*

In this example the supernatant liquid containing excess peroxide and residual Pu treated was the same type as described in detail in the preceding example and was obtained under similar process conditions. The liquid was transferred to a tank for temporary storage with cooling while the precipitate was being removed from a precipitator after which liquid was returned to the precipitator for treatment in accordance with the present invention. In this example, however, an additional feature was employed of diluting the liquid containing excess peroxide approximately fourfold with water. Thereafter the acidity was adjusted with nitric acid, and then the liquid was made 3 molar in potassium nitrite. In all instances the liquid was kept cooled between a temperature of 15° C. and 25° C. The treated liquid was returned to an earlier step in the process, namely, to the lanthanum fluoride by-product precipitation step. Overall computations indicated that at least 90% of the residual Pu in the supernatant liquid was recovered.

*Example III*

In this example the supernatant liquid treated contained about 10% peroxide and otherwise was similar to the supernatant liquids already described. However, in this example the acidity of the solution was adjusted to a pH of about 3 by adding sodium acetate. Thereafter there was added to this buffered solution sufficient sodium nitrite to render the solution 10 molar therein. In other words, a considerably greater concentration and smaller volume of sodium nitrite was used. As in the other examples, the reaction was carried out in the precipitator including maintaining the temperature of 15–25° C. with cooling and agitation.

The treated solution was recycled without difficulty, as in the preceding examples.

*Example IV*

In this example the supernatant liquid containing residual peroxide and plutonium was processed by treatment which involved increasing the acidity. That is, for each volume of the supernatant liquid, there was added about ⅓ of a volume of 10 N nitric acid. Thereafter, there was slowly added the required quantity of sodium nitrite dissolved in 0.8 volume of water. The temperature of this run was maintained below 15° C. It was determined colorimetrically that sufficient nitrite had been added so that all of the residual peroxide had been destroyed rendering the liquid suitable for recycling or other treatment.

*Example V*

In accordance with this example the liquid treated contained residual peroxide and Pu as in the preceding examples. However, in this example a different reagent was employed namely a sulfite reagent. The liquid was first diluted by 50% to eliminate any possibility of splattering at the start of the process. Thereafter a 3–4 molar ammonium hydrogen sulfite solution was added accompanied by agitation and with cooling as already described. The utilization of a sulfite in this example to treat the liquid has the advantage of little or no gas evolution. However, it may give a rather high sulfate concentration in the final liquid to be recycled which might cause a sulfate of lanthanum to precipitate in the step to which the liquid is recycled. Such possibility of precipitation may be eliminated by further diluting the liquid by a factor of 2–2½ which eliminates the possibility of sulfates of lanthanum and ammonium precipitating.

When using sulfite reagent there are various sources which may be employed. For example $(NH_4)_2SO_3$ diammonium sulfite may be used or $H_2SO_3$ sulfurous acid may be used. When the latter is used overall dilution of 4 or 5 times is preferred. At such volume the solution would contain about 15 grams per liter of $La_2(SO_4)_3$ whereas its solubility is in the order of 30 grams per liter. As in the preceding examples, the end point of the reaction in destroying excess peroxide may be determined by potassium permanganate titration of samples of the solution or by spot tests for excess of either hydrogen peroxide or the sulfite or nitrite ion.

From the preceding examples it may be seen that we have provided a relatively simple procedure for treating potentially hazardous liquids containing peroxide with certain reagents exemplified by nitrites and sulfites for rendering the liquids non-hazardous and suitable for further treatment or uses. The exact amount of the reagent to be added will of course depend upon the content of residual peroxide to be destroyed or rendered inactive and related factors. The amount may be precalculated by making a suitable preliminary assay and as indicated usually 85% of the calculated amount is sufficient to accomplish the treatment. Or the reagent may be added until a slight excess thereof is indicated by the use of indicators as described. One suitable indicator is the dimethylaniline-benzidine-acetic indicator already referred to which turns red in the presence of nitrite. A convenient indicator for peroxide is prepared by dissolving 3 grams of ammonium vanadate in 50 cc. of 8 N sulfuric acid. This indicator gives a reddish color in the presence of peroxide, and a bluish color in presence of sulfite or nitrite. Other methods of control will be apparent from the present description. The potassium or other soluble salts may be used in place of the sodium reagents described. Various forms of the sulfite may be employed, as indicated. Likewise other oxidizing agents such as dichromates may be used in place of the permanganates.

While it is not desired to be bound by any theories relative to the mechanism of the present process, the following may constitute a description of some of the reactions which take place. The reaction of peroxide with nitrite may be as follows:

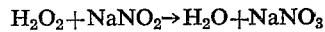

This reaction liberates about 46.5 kg.-cal. of heat which is dissipated by cooling as described in the several examples. Cooling within the range of 0°–30° C. is entirely satisfactory although 15° C. is usually preferred. The addition of acid as described in certain of the examples prevents the formation of an unidentified precipitate which may form during nitrite addition. The presence of nitric acid in the reaction makes it desirable to add the nitrite to the nitric acid containing liquid rather than reversing the order of addition for preventing the evolution of oxides of nitrogen. The elimination of any excess of sulfite or nitrite reagents is probably in accordance with the reaction illustrated by the following:

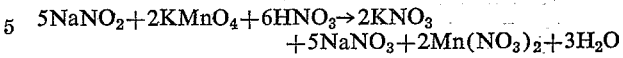

While the probable content of excess peroxide in the liquid treated is described in some of the several examples as about 10%, this is not a limitation on our invention. The content of residual peroxide may be smaller or larger, the process of the present invention merely being varied to include the addition of smaller or larger amounts of reagent. Likewise the process functions whether there be a small or large content of residual plutonium in the liquid being treated. Usually however the content of plutonium will not exceed 5 grams per liter of liquid as removed from the precipitate, although similar liquids from other sources may be added to the supernatant.

It is to be understood that all matters contained in the above description and examples are illustrative only and do not limit the scope of this invention as it is intended to claim the invention as broadly as possible in view of the prior art.

We claim:

1. In processes for plutonium recovery comprising incomplete precipitation of plutonium values from an aqueous, acidic, substantially 1 N $HNO_3$ as plutonium peroxide by means of adding excess hydrogen peroxide thereto, and separating the resulting plutonium peroxide precipitate from its supernatant solution, the improvement method for subsequently eliminating residual hydrogen peroxide contained in said supernatant solution without concomitantly eliminating residual plutonium values therefrom, which comprises buffering the acidity of said supernatant solution to approximately pH 3 by means of incorporating sodium acetate therein, and thereupon adding to and dissolving in the so buffered supernatant solution, sodium nitrite, to a concentration of approximately 10 molar.

2. In processes for the recovery of plutonium values from an initial aqueous, acidic solution containing the same in substantially the hexavalent state, comprising reduction of said plutonium values to the tetravalent state, carrier precipitation of plutonium from said solution by means of precipitation therein of lanthanum fluoride while maintaining the plutonium substantially tetravalent, separation of the resulting plutonium-containing precipitate, derivation therefrom of an aqueous, acidic solution containing said plutonium values, incomplete precipitation from said derived solution of said plutonium values as plutonium peroxide by means of adding excess hydrogen peroxide thereto, separating the resulting plutonium peroxide precipitate from its supernatant solution, and recycling said supernatant solution consequently containing dissolved residual plutonium values to a fresh batch of said initial solution about to undergo the aforesaid processing, the improvement method which comprises the combination with the aforesaid processing of adding to and dissolving in said supernatant solution, subsequent to said separation of plutonium peroxide precipitate therefrom, an anion chosen from the group consisting of the nitrite and sulfite anions, to eliminate residual hydrogen peroxide contained therein without concomitantly eliminating contained residual plutonium values therefrom.

3. In processes for the recovery of plutonium values from an initial aqueous, acidic solution containing the same in substantially the hexavalent state, comprising reduction of said plutonium values to the tetravalent state, carrier precipitation of plutonium from said solution by means of precipitation therein of lanthanum fluoride while maintaining the plutonium substantially tetravalent, separation of the resulting plutonium-containing precipitate, derivation therefrom of an aqueous, acidic solution containing said plutonium values, incomplete precipitation from said derived solution of said plutonium values as plutonium peroxide by means of adding excess hydrogen peroxide thereto, separating the resulting plutonium peroxide precipitate from its supernatant solution, and recycling said supernatant solution consequently containing dissolved residual plutonium values to a fresh batch of said initial solution about to undergo the aforesaid processing, the improvement method which comprises the combination with the aforesaid processing of adding to and dissolving in said supernatant solution, subsequent to said separation of plutonium peroxide precipitate therefrom, an anion chosen from the group consisting of the nitrite and sulfite anions, to eliminate residual hydrogen peroxide contained therein without concomitantly eliminating contained residual plutonium values therefrom, and thereafter adding to and dissolving in said supernatant solution potassium permanganate to eliminate by oxidation any unexpended said anion therein, prior to said recycling thereof.

References Cited in the file of this patent
UNITED STATES PATENTS 2,785,951    Thompson et al. -------- Mar. 19, 1957

OTHER REFERENCES

Rose: A Practical Treatise of Chemical Analysis, vol. 1, pages 210–211 (1848). Wm. Tegg & Co., London.

Smith's College Chemistry, pages 290–293 (1924). Century Company, New York.

AEC Document M-CN-1884, page 7, declassified February 16, 1957, Semi-monthly Report for the period ending August 15, 1944, and this date relied on to show prior knowledge under Sec. 155, Act of 1954.